(12) United States Patent
Mikolajczyk et al.

(10) Patent No.: US 9,910,865 B2
(45) Date of Patent: Mar. 6, 2018

(54) METHOD FOR CAPTURING THE MOMENT OF THE PHOTO CAPTURE

(71) Applicant: NVIDIA Corporation, Santa Clara, CA (US)

(72) Inventors: Peter Mikolajczyk, Bothell, WA (US); Patrick Shehane, Fremont, CA (US); Guanghua Gary Zhang, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/959,417

(22) Filed: Aug. 5, 2013

(65) Prior Publication Data
US 2015/0039621 A1    Feb. 5, 2015

(51) Int. Cl.
*G06F 7/00*    (2006.01)
*G06F 17/30*    (2006.01)

(52) U.S. Cl.
CPC .............................. *G06F 17/30265* (2013.01)

(58) Field of Classification Search
CPC ......... G06F 17/30265; G06F 17/30076; G06F 17/3028; H04N 1/32101
USPC ................................. 707/736, 737, 740, 756
See application file for complete search history.

(56) References Cited

U.S. PATENT DOCUMENTS

| | | |
|---|---|---|
| 5,724,579 A | 3/1998 | Suzuki |
| 7,039,873 B2 * | 5/2006 | Morris et al. ............. 715/748 |
| 8,254,684 B2 | 8/2012 | Raju |
| 8,457,366 B2 | 6/2013 | Cheswick |
| 8,731,534 B2 | 5/2014 | Kim et al. |
| 8,799,277 B2 | 8/2014 | Park et al. |
| 8,810,684 B2 | 8/2014 | Chang |
| 8,855,610 B2 | 10/2014 | Kim |
| 2002/0001395 A1 * | 1/2002 | Davis ............. G06F 21/10 382/100 |
| 2003/0174218 A1 | 9/2003 | Battles |
| 2003/0188178 A1 | 10/2003 | Strongin et al. |
| 2004/0201751 A1 | 10/2004 | Bell et al. |
| 2004/0207722 A1 | 10/2004 | Koyama et al. |
| 2006/0044417 A1 | 3/2006 | Tashiro et al. |
| 2007/0053335 A1 | 3/2007 | Onyon et al. |
| 2007/0229678 A1 | 10/2007 | Barrus et al. |
| 2008/0146274 A1 | 6/2008 | Cho |
| 2008/0240702 A1 | 10/2008 | Wassingbo et al. |
| 2008/0243861 A1 | 10/2008 | Wassingbo et al. |

(Continued)

OTHER PUBLICATIONS

Muller, How It Works: Encrypting File System, Jun. 2006, TechNet Magazine.

(Continued)

*Primary Examiner* — Md. I Uddin

(57) ABSTRACT

A method for storing digital images is presented. The method includes capturing an image using a digital camera system. It also comprises capturing metadata associated with the image or a moment of capture of the image. Further, it comprises storing the metadata in at least one field within a file format, wherein the file format defines a structure for the image, and wherein the at least one field is located within an extensible segment of the file format. In one embodiment, the metadata is selected from a group that comprises audio data, GPS data, time data, related image information, heat sensor data, gyroscope data, annotated text, and annotated audio.

18 Claims, 11 Drawing Sheets

(56) References Cited

U.S. PATENT DOCUMENTS

| | | |
|---|---|---|
| 2008/0279481 A1 | 11/2008 | Ando |
| 2009/0021594 A1 | 1/2009 | Tsuda et al. |
| 2009/0023472 A1 | 1/2009 | Yoo et al. |
| 2009/0037477 A1 | 2/2009 | Choi et al. |
| 2009/0086074 A1 | 4/2009 | Li et al. |
| 2009/0252383 A1 | 10/2009 | Adam et al. |
| 2009/0280859 A1 | 11/2009 | Bergh |
| 2009/0324022 A1 | 12/2009 | Sangberg et al. |
| 2010/0002096 A1* | 1/2010 | Hong .................. 348/231.3 |
| 2010/0085446 A1 | 4/2010 | Thorn |
| 2010/0088522 A1* | 4/2010 | Barrus .................. G06F 21/64 713/181 |
| 2010/0162171 A1 | 6/2010 | Felt et al. |
| 2010/0172550 A1 | 7/2010 | Gilley et al. |
| 2010/0216441 A1 | 8/2010 | Larsson et al. |
| 2010/0241658 A1 | 9/2010 | Rathurs et al. |
| 2010/0262928 A1 | 10/2010 | Abbott |
| 2010/0322401 A1 | 12/2010 | Ryu |
| 2011/0053570 A1 | 3/2011 | Song et al. |
| 2011/0129120 A1 | 6/2011 | Chan |
| 2011/0183732 A1 | 7/2011 | Block et al. |
| 2011/0237229 A1 | 9/2011 | Shimagaki |
| 2011/0261244 A1 | 10/2011 | Ogawa et al. |
| 2012/0098861 A1 | 4/2012 | Mei et al. |
| 2012/0249853 A1 | 10/2012 | Krolczyk et al. |
| 2012/0287217 A1 | 11/2012 | Prentice |
| 2012/0308077 A1 | 12/2012 | Tseng |
| 2012/0314917 A1 | 12/2012 | Kiyohara et al. |
| 2012/0321143 A1 | 12/2012 | Krupka et al. |
| 2013/0027569 A1 | 1/2013 | Parulski |
| 2013/0027571 A1 | 1/2013 | Parulski |
| 2013/0033611 A1 | 2/2013 | Chen |
| 2013/0039531 A1* | 2/2013 | Basso .................. G06F 3/017 382/103 |
| 2013/0187862 A1 | 7/2013 | Jan et al. |
| 2014/0055553 A1 | 2/2014 | Lee |
| 2015/0058708 A1 | 2/2015 | Georgiev |
| 2015/0074206 A1 | 3/2015 | Baldwin |
| 2015/0081791 A1 | 3/2015 | Jacobs |
| 2015/0169987 A1* | 6/2015 | Nalawadi .......... G06F 17/30247 382/203 |

OTHER PUBLICATIONS

NTFS.com, EFS—Encrypting File System. Encrypted Files and Folders (NTFS5 only), Mar. 2010.

Techopedia, Protected Mode, Oct. 2011.

Martin, "Windows Explorer file name colors?", Sep. 4, 2009, Microsoft Community.

\* cited by examiner

| Field | Size (bytes) | Description |
|---|---|---|
| 404 App0 marker | 2 | Always equals 0xFFE0 |
| 406 Length | 2 | Length of segment excluding APP0 marker |
| 408 Identifier | 5 | Always equals JFXX (with zero following) (0x4A6585800) |
| 410 Density units | 1 | Units for pixel density fields |
| 412 X Density | 2 | Integer horizontal pixel density |
| 414 Y Density | 2 | Integer vertical pixel density |
| 416 Thumbnail width (tw) | 1 | Horizontal size of embedded JFIF thumbnail in pixels |
| 418 Thumbnail height | 1 | Vertical height of embedded JFIF thumbnail in pixel |
| 420 Thumbnail data | 3 x tw x th | Uncompressed 24 bit RGB raster thumbnail |
| 422 Audio data | Variable | Audio data associated with image |
| 424 GPS data | 2 | GPS data associated with image |
| 426 Time data | 2 | Time data associated with image |
| 428 Related images | Variable | Links or file paths of related images |
| 430 Other | Variable | Other data |

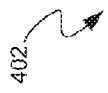

FIG. 4

| Field | Size (bytes) | Description |
|---|---|---|
| App0 marker | 2 | Always equals 0xFFE0 |
| Length | 2 | Length of segment excluding APP0 marker |
| Identifier | 5 | Always equals JFXX (with zero following) (0x4A6585800) |
| Thumbnail format | 1 | Specifies what data format is used for the thumbnail |
| Thumbnail data | Variable | JPEG: Must be JIF format |
| Audio data | Variable | Audio data associated with image |
| GPS data | 2 | GPS data associated with image |
| Time data | 2 | Time data associated with image |
| Related images | Variable | Links or file paths of related images |
| Other | Variable | Other data |

FIG. 5

METHOD FOR CAPTURING THE MOMENT OF THE PHOTO CAPTURE

CROSS-REFERENCE TO RELATED APPLICATIONS

Related Applications

The present application is related to U.S. patent application Ser. No. 13/959,383, filed Aug. 5, 2013, entitled "A METHOD FOR SHARING ORIGINAL PHOTOS ALONG WITH A FINAL PROCESSED IMAGE," naming Patrick Shehane and Guanghua Gary Zhang as inventors. That application is incorporated herein by reference in its entirety and for all purposes.

The present application is related to U.S. patent application Ser. No. 13/959,439, filed Aug. 5, 2013, entitled "A METHOD FOR SHARING DIGITAL PHOTOS SECURELY," naming Patrick Shehane and Guanghua Gary Zhang as inventors. That application is incorporated herein by reference in its entirety and for all purposes.

FIELD OF THE INVENTION

Embodiments according to the present invention generally relate to capturing images and more specifically to methods for storing captured images.

BACKGROUND OF THE INVENTION

Image file formats are standardized means of organizing and storing digital images. Image files are composed of digital data in one of these formats that can be rasterized for use on a computer display or printer. An image file format may store data in uncompressed, compressed, or vector formats. Including certain proprietary types, there are hundreds of image file types. Some image file formats typically used to display images on the Internet are Graphics Interchange Format (GIF), Portable Network Graphics (PNG), and JPEG File Interchange Format (JFIF). Joint Photographic Experts Group (JPEG) is a popular method for compressing images circulated on the Internet, and JPEG-compressed images are usually stored in the JFIF file format or Exchangeable image file format (EXIF).

While various different types of image formats are currently employed for storing and transmitting images by digital cameras and other portable electronic devices with image capturing capabilities, conventional image file formats are typically limited in the type of information that can be stored and transmitted along with the image data. In part, this limitation exists in the various standards, e.g., JFIF, EXIF, etc. in order to minimize the storage space required to store and bandwidth required to transmit the images. However, with storage becoming increasingly cheaper and broadband speeds increasing, the inability to transmit different types of associated information along with the images poses a needless and constricting limitation on the user.

BRIEF SUMMARY OF THE INVENTION

Accordingly, a need exists for systems and methods for enhancing users' interactions with digital images by allowing the user to encode other types of information, e.g., audio, links to related images, global positioning system (GPS) related information, etc., within certain designated segments of the corresponding image file format. Further, a need exists for a dynamic, non-standard image file format that has fields allocated for storing associated information or metadata related to the image data. Alternatively, a need exists for modifying standardized image formats, e.g., the JFIF image format to allow additional related metadata to be included in designated fields within the image.

Embedding additional metadata along with image data in a digital image would be advantageous because typically a static image by itself does not fully capture the moment. Often times, a user would like to be able to convey other sensory details concerning the image, for example, the background music that could be heard when the image was captured. Other times, a user would like to be able to make a textual or voice annotation regarding an image and store that information within the image itself. Therefore, it is highly desirable to provide an image file format that has the flexibility of having extensible segments that can store additional information that can be accessed when viewing the image so that the viewers' experience in viewing the image can be made more enjoyable by rendering other information that is related to the image and/or the time at which the image was taken.

A method for storing digital images is presented. The method includes capturing an image using a digital camera system. It also comprises capturing metadata associated with the image or a moment of capture of the image. Further, it comprises storing the metadata associated with the image in at least one field within a file format, wherein the file format defines a structure for the image, and wherein the at least one field is located within an extensible segment of the file format. In one embodiment, the metadata is selected from a group that comprises audio data, GPS data, time data, related image information, heat sensor data, gyroscope data, annotated text, and annotated audio. In one embodiment, the metadata may be related to events that occur contemporaneous or substantially contemporaneous with image capture.

In another embodiment, an apparatus for storing digital images is disclosed. The apparatus comprises a display screen configured to display an image, a memory, a camera, and a processor. The process is configured to: (a) capture the image using the digital camera system; (b) capture metadata associated with the image or a moment of capture of the image; and (c) store the metadata in at least one field within a file format, wherein the file format defines a structure for the image, and wherein the at least one field is located within an extensible segment of the file format.

In yet another embodiment, a method for decoding an image is presented. The method comprises receiving an image from a digital image capture device, wherein the image comprises a file format with an extensible segment, and wherein the extensible segment comprises at least one field for storing metadata associated with the image or a moment of capture of the image. It also comprises displaying the image within a user interface, wherein the user interface comprises an option to access the metadata.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 4 illustrates the modification of a JFIF segment to incorporate associated metadata in accordance with an embodiment of the present invention.

FIG. 5 illustrates the modification of a JFIF extension segment to incorporate associate metadata in accordance with an embodiment of the present invention.

Figure 1:
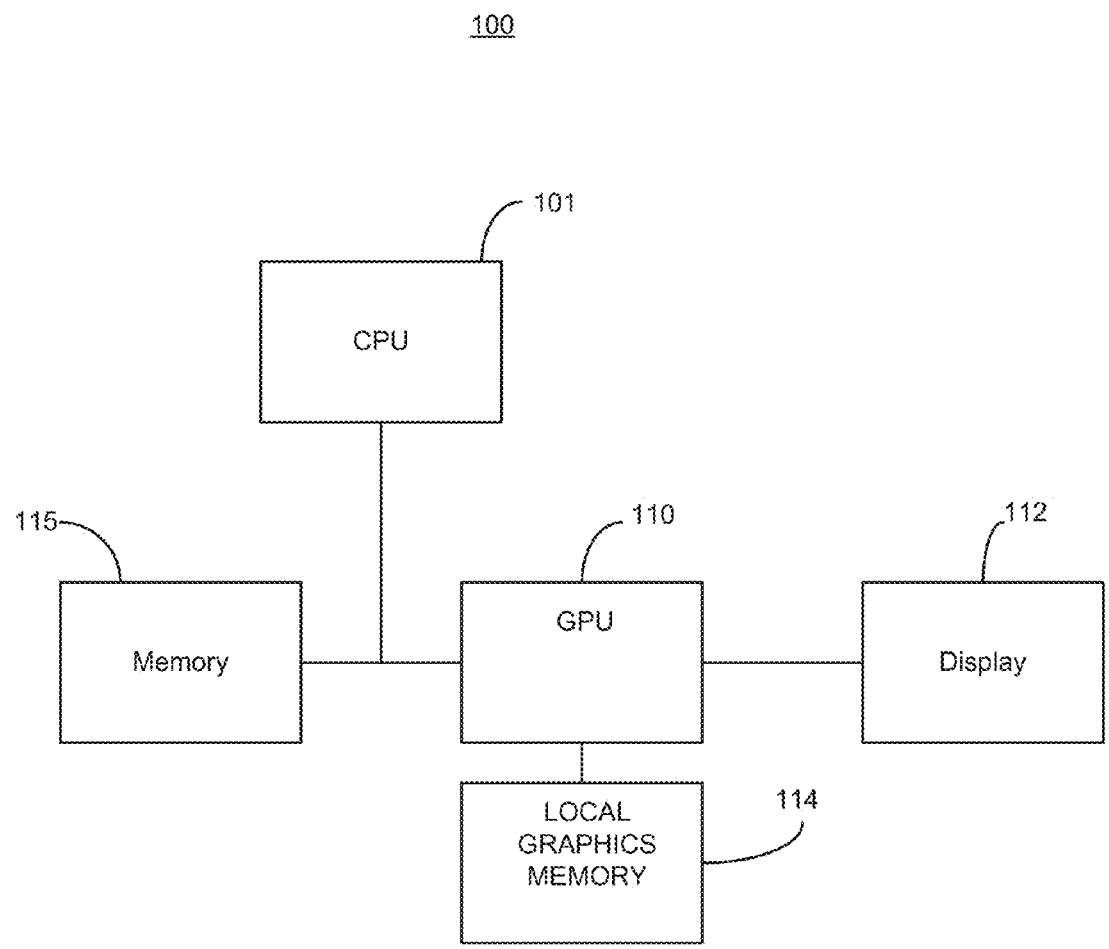
FIG. 1 shows an exemplary computer system 100 used to capture and/or display images in accordance with one embodiment of the present invention.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

NOTATION AND NOMENCLATURE

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "capturing," "storing," "linking," "providing," "receiving," "running," and "organizing," or the like, refer to actions and processes (e.g., flowchart 900 of FIG. 9) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 shows an exemplary computer system 100 used to capture and/or display images in accordance with one embodiment of the present invention. Computer system 100 depicts the components of a generic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cell-phone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

A Method for Capturing the Moment of the Photo Capture

Most conventional image formats in commercial use today constrict the scope of what a user can do with a captured image. More specifically, conventional image formats do not have the flexibility to allow images to be more interactive, for example, by providing for designated segments within the file format of the image to store associated metadata that can be accessed by the user while viewing the image or otherwise.

Accordingly, embodiments of the present invention provide for systems and methods for enhancing users' interactions with digital images by allowing the user to encode other types of information, e.g., audio, links to related images, global positioning system (GPS) related information, etc., within certain designated segments of the corresponding image file format. Further, in one embodiment of the present invention, a dynamic, non-standard image file format is provided that contains fields allocated for storing various types of associated information or metadata related to the image data. In a different embodiment, the present invention provides a method for modifying standardized image formats, e.g., the JFIF image format to allow additional related metadata to be included in designated fields within the image.

Embedding additional metadata along with image data in a digital image is advantageous because typically a static image by itself does not fully capture the moment. Often, a user would like to be able to convey other sensory details concerning the image, for example, the background music that could be heard when the image was captured. Other times, a user would like to be able to make a textual or voice annotation regarding an image and store that information within the image itself. Therefore, it is highly desirable to provide an image file format that has the flexibility of having extensible segments that can store additional information that can be accessed when viewing the image. Embodiments of the present invention allow images to be more dynamic by providing for flexible file formats that can carry other interesting information regarding the image that just the static image data. In addition, this allows the user's experience to be more pleasing and enjoyable.

Figure 2:
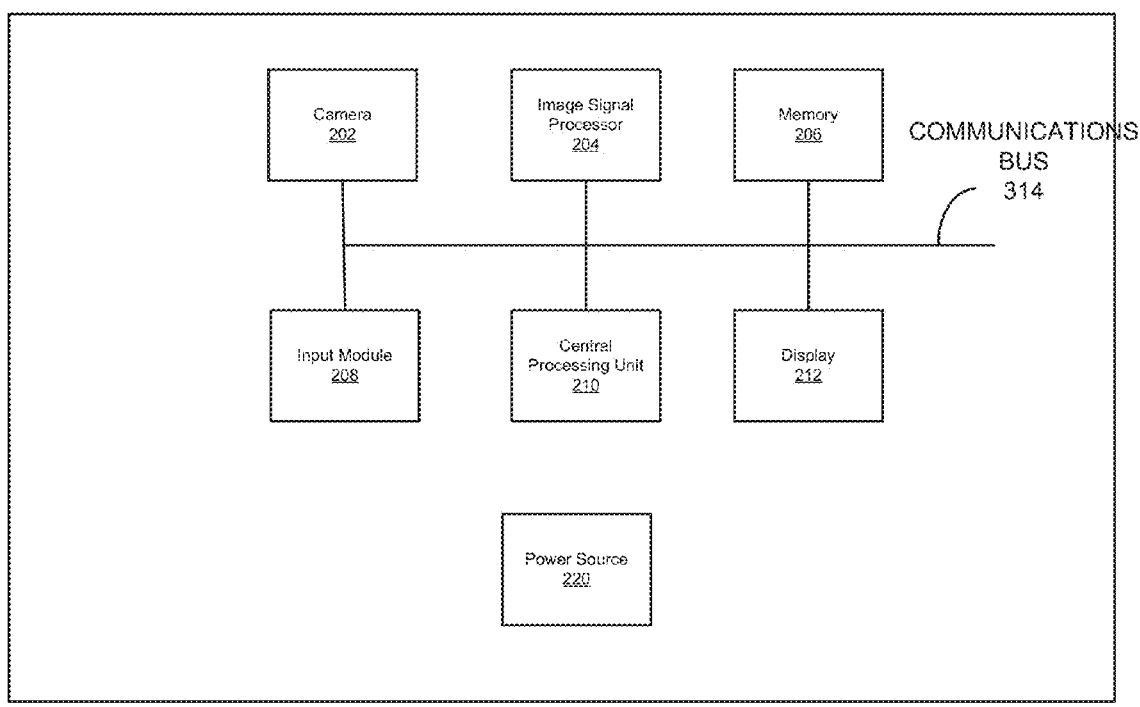
FIG. 2 shows an exemplary operating environment of a device capable of capturing and storing associated metadata in the captured images in accordance with one embodiment of the present invention.

FIG. 2 shows an exemplary operating environment of a device capable of capturing and storing associated metadata in the captured images in accordance with one embodiment of the present invention. System 200 includes camera 202, image signal processor (ISP) 204, memory 206, input module 208, central processing unit (CPU) 210, display 212, communications bus 214, and power source 220. Power source 220 provides power to system 200 and may be a DC or AC power source. System 200 depicts the components of an exemplary system in accordance with embodiments of the present invention providing the execution platform for certain hardware-based and software-based functionality. Although specific components are disclosed in system 200, it should be appreciated that such components are examples. That is, embodiments of the present invention are well suited to having various other components or variations of the components recited in system 200. It is appreciated that the components in system 200 may operate with other components other than those presented, and that not all of the components of system 200 may be required to achieve the goals of system 200.

CPU 210 and the ISP 204 can also be integrated into a single integrated circuit die and CPU 210 and ISP 204 may share various resources, such as instruction logic, buffers, functional units and so on, or separate resources may be provided for image processing and general-purpose operations. System 200 can be implemented as, for example, a digital camera, cell phone camera, portable device (e.g., audio device, entertainment device, handheld device), webcam, video device (e.g., camcorder) or any other device with a front or back facing camera that allows the device to detect the presence of a user.

In one embodiment, camera 202 captures light via a front-facing or back-facing cameras (depending on how the user typically holds the device), and converts the light received into a signal (e.g., digital or analog). In another embodiment, system 200 may also have another camera facing away from the user (not shown). Camera 202 may comprise any of a variety of optical sensors including, but not limited to, complementary metal-oxide-semiconductor (CMOS) or charge-coupled device (CCD) sensors. Camera 202 is coupled to communications bus 214 and may provide image data received over communications bus 214. Camera 202 may comprise functionality to determine and configure optical properties and settings including, but not limited to, focus, exposure, color or white balance, and areas of interest (e.g., via a focus motor, aperture control, etc.).

In one embodiment, camera 202 in FIG. 2 represents two cameras, one with a lower resolution than the other camera, as disclosed in co-pending applications, U.S. patent application Ser. No. 13/609,019, titled "System and Method for Enhanced Monoimaging" filed on Sep. 10, 2012, and United Stated patent application Ser. No. 13/609,062, titled "System and Method For Enhanced Stereo Imaging," filed on Sep. 10, 2012, both of which are incorporated herein by reference in their entirety and for all purposes.

Image signal processor (ISP) 204 is coupled to communications bus 214 and processes the signal generated by camera 204, as described herein. More specifically, image signal processor 204 may process data from camera 202 for storing in memory 206. For example, image signal processor 204 may compress and determine a file format for an image to be stored in within memory 206. Further, by of example, image signal processor may be configured to add metadata related to the image within the file format for the image as well. Alternatively, CPU 210 could also be configured to populate the designated segments within the file format of the image with the related metadata, e.g., audio clips related to the image.

Input module 208 allows entry of commands into system 200 which may then, among other things, control the sampling of data by camera 202 and subsequent processing by ISP 204. Input module 208 may include, but it not limited to, navigation pads, keyboards (e.g., QWERTY), up/down buttons, touch screen controls (e.g., via display 212) and the like.

Central processing unit (CPU) 210 receives commands via input module 208 and may control a variety of operations including, but not limited to, sampling and configuration of camera 202, processing by ISP 204, and management (e.g., addition, transfer, and removal) of images and/or video from memory 206.

Figure 3:
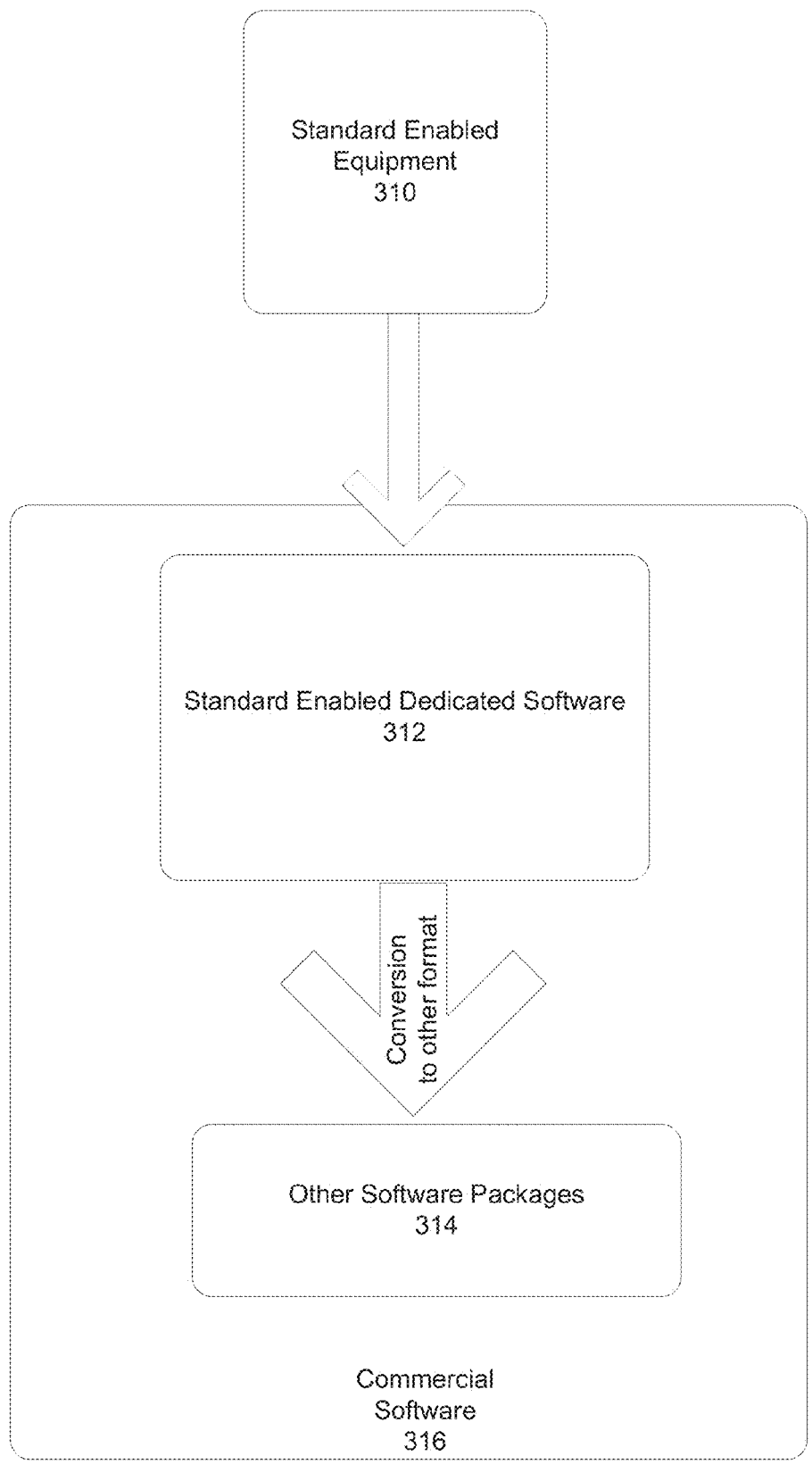
FIG. 3 is a high level block diagram illustrating the elements of the image system proposed in accordance with an embodiment of the present invention.

FIG. 3 is a high level block diagram illustrating the elements of the image system proposed in accordance with an embodiment of the present invention. In one embodiment of the present invention, standard enabled equipment 310 is capable of capturing and storing images with associated metadata in designated segments of the image file format. A basic condition of the equipment 310 with a playback function is that it be able to read the files with the associated metadata it stores. In one embodiment, standard enabled equipment 310 performs a similar function to system 200 in FIG. 2.

The protocol used for storing images by equipment 310 can be a modified variation to an existing standard, e.g., JFIF that has been altered to accommodate additional metadata fields. Alternatively, in one embodiment, the equipment 310 can store images in accordance with a new standard that has designated fields for embedding associated metadata, e.g., audio clips, related image information, etc. The standard enabled equipment 310 can be an imaging device such as a camera, or a portable electronic device such as a phone, tablet, etc. with a camera that is capable of capturing images.

The standard enabled equipment 310 can, in one embodiment, communicate with a standard enabled dedicated software 312 that is operable to receive and decode the images and associated metadata from the equipment 310. In the personal computer environment, for example, the requirement would be that the dedicated software 312 be able to read all the images from equipment 310 including all the associated metadata and attribute information in conformance with the modified or new file format standard. In one embodiment, the dedicated software 312 is a type of commercial software 316 that is widely available commercially or provided by the manufacturer of equipment 310. In one embodiment, the dedicated software 312 can be configured to allow the user to view the image while presenting the option to view or access the associated metadata stored in a designated field within the image. In one embodiment, the dedicated software 316 can be used to convert the images with associated metadata into formats that are recognized by standard commercial software packages 314.

There are several possible ways to define new fields for a standard image file format that designates segments for the storage of associated metadata in accordance with embodiments of the present invention.

Similarly, there are several techniques for customizing existing file formats to support storage of associated metadata. One such file format, as discussed above, is JFIF. JFIF is designed to allow files containing JPEG-encoded streams to be exchanged between otherwise incompatible systems and applications. FIG. 4 illustrates the modification of a JFIF segment 402 to incorporate associated metadata in accordance with an embodiment of the present invention.

A valid JFIF file must typically start with a two-byte start-of-image (SOI) marker (not shown) which is 0xFFD8. This is followed by a JFIF APP0 (Application) marker 404, which consists of the marker code values 0xFFE0 and the characters "JFIF" in the marker data. Although JFIF files do not possess a formally-defined header, the SOI and JFIF APP0 markers taken together act as a header in the marker segment structure 402 illustrated in FIG. 4. The length field 406 is the size of the JFIF marker segment 402, including the size of the length field 406 itself and any thumbnail or other data contained in the APP0 segment.

The other fields that are conventionally present in a JFIF (APP0) marker segment are as follows: a) an identifier field 408 used to identify the code stream as conforming to the JFIF specification; b) a density units field 410 to identify units for pixel density fields; c) an X Density field 412 and a Y Density field 414 to identify the unit of measurement used to describe the image resolution; d) a thumbnail width 416 to define the horizontal size of embedded JFIF thumbnail; e) a thumbnail height 418 to define the height of an embedded JFIF thumbnail; and f) thumbnail data 420 comprising the image data for the thumbnail.

In addition to the conventional fields defined in the JFIF (APP0) marker segment, in one embodiment of the present invention, the JFIF (APP0) marker segments can be extended to incorporate additional fields, e.g., fields 422, 424, 426, 428 and 430 in FIG. 4, in order to provide the flexibility and convenience to embed metadata associated with the image. For example, an audio data field 422 can be added to the marker segment that embeds a short encoded audio clip related to the image within the image itself. Embedding an encoded audio clip in the image file itself is advantageous, because while in some cases an image by itself can be sufficient, in most cases users may want to record other sensory input contemporaneous with the taking of the image. For example, if the user is proposing to a significant other, it would be highly desirable to be able to capture a few seconds of audio right before and after the capturing of the image in order to record the buildup to the moment including the reaction to the proposal.

While most cameras can record video, simply capturing a video of the occasion does not provide the desired functionality and flexibility because videos in most cases are much lower quality and require more storage than an image with audio. Also, typically a single representative image of an event like a wedding proposal, a goal in a soccer game, or a student's graduation can be much more memorable than a video clip. In addition, finding a single representative image from a video clip comprising 30 to 40 seconds of footage, for example, is more challenging that simply capturing a single image when the timing is right. Further, in certain cases the user may just want a still image of the occasion while having the flexibility to listen to a brief audio clip related to the image.

In one embodiment, the recording of the audio clip is activated when the user initiates the focusing process so as to capture a few seconds of audio before the actual image is captured. In another embodiment, the audio clip can start recording when the user actuates the image capture trigger. In another embodiment, audio is continuously recorded within a buffer of predefined duration. When one picture or pictures are taken, the audio recorded before and after the capture moment is used. In one embodiment, the audio clip may be an mp3 or wma clip, or be configured in accordance with any one of several available formats.

In other embodiments, a separate pushbutton or special input on the touch screen, for example two finger touch, can be provided to activate the audio recording, so that the audio capture process is not tied to image capture. The user can then be presented an option to choose the image that the audio clip should be associated with. The equipment 310 can then encode the audio clip and embed it in the designated segment of the file format for the user specified image. In one embodiment, the audio recording can be stopped using a special pushbutton or screen touch after an image is captured. In a different embodiment, the start and the stop of audio recording can also be initiated through a timer.

In one embodiment, the user is provided with the flexibility to control the length of the audio clip. The user may do this using a user interface on equipment 310 or software 312 that allows the user to control options related to the captured images. In accordance with this flexibility, the size of field 422 in the JFIF (APP0) marker segment is variable.

In one embodiment, the present invention allows GPS data 424 to also be embedded in, for example, the marker segment of the JFIF file as shown in FIG. 4. This GPS metadata field can be used for various purposes by equipment 310 and dedicated software 312, including, for example, to group related images. As will be explained further below, in one embodiment, the GPS field can be encrypted for privacy reasons so that it can be accessed by equipment 310 and software 312 to identify and group related images, but may not be accessed for viewing in a publicly readable format or for any other purpose. In one embodiment, the GPS field can be used to organize and group pictures automatically as they are captured by equipment 310.

In one embodiment, the present invention allows time data 426 to also be embedded in, for example, the marker segment of the JFIF file as shown in FIG. 4. While conventional image formats may allow the time of image capture to be saved with the image file, the present invention allows the time to be embedded in a dedicated field that can then be used to search for and identify related images taken within a certain time duration. Further, in one embodiment, the present invention may allow the user to have control over the time data field 426 and be able to manually adjust it if needed either using equipment 310 or software 312. Also, in one embodiment, the time field may be encrypted for privacy reasons.

In one embodiment, the present invention allows related image data 428 to be embedded in, for example, the marker segment of the JFIF file as shown in FIG. 4. The related images field 428 can, in one embodiment, be variable. Related image data can be stored in any number of various ways. For example, in one embodiment, links or pointers to all the various related images can be stored within this field. In a different embodiment, field 428 can comprise a file path for all related images. In yet another embodiment, field 428 can comprise a thumbnail of all related images. It may even comprise one or more short related movies regarding the image.

The criteria for what constitutes a related image may be ascertained by the user and entered through a user interface into the image capture settings available in equipment 310 or software 312. Exemplary criteria that can be used to identify related images are time of image, GPS location data in image, file name, file path, user annotation in field 430 (discussed in more detail below), etc. For example, a user may choose to identify all images taken on his or her birthday as a related image. In this case, time field 426 may be used to identify the relevant images. Subsequently, links would be added to the related images field 428 to images taken on the user's birthday that can be accessed by the equipment 310 or software 312. In one embodiment, if the storage space on equipment 310 is limited, then the software 312 can be configured to perform another search to identify further related images after the images are downloaded from equipment 310 to software 312.

In one embodiment, a voice speech search procedure may be employed on the audio data 422 field of the images to identify related images. For example, the voice speech search could be used to search all images where the "Happy Birthday" song is sung. Once the related images have been identified, information regarding these images is subsequently added in field 428.

In one embodiment, related images can be images captured immediately preceding or following the moment of shutter press. When capturing a photo of a moment, either of family, friends, or a scene, several images preceding and proceeding the time of shutter press can be captured, encoded and saved in field 428 so that a later playback can provide more than just a static representation of that moment in time. In one embodiment, a short movie capture could be saved as well in the related images field 428.

Co-pending applications, U.S. patent application Ser. No. 13/609,019, titled "System and Method for Enhanced Monoimaging" filed on Sep. 10, 2012, and United Stated patent application Ser. No. 13/609,062, titled "System and Method For Enhanced Stereo Imaging," filed on Sep. 10, 2012, discloses a system comprising two cameras wherein, in one embodiment, the pictures using the two cameras may be captured substantially simultaneously. In one embodiment of the present invention, each of the images captured by the respective camera could comprise an embedded link or thumbnail of the image captured by the other camera.

Similarly, in one embodiment, for devices that comprise both a front facing and back facing camera, images could be captured by both cameras substantially simultaneously. Further, associated metadata could be stored in field 428 of each image comprising information regarding the image captured by the other camera on the same device. Further, a first image taken from the front facing camera could be authenticated using information from a second image taken using the back facing camera and stored within field 428 of the first image. For example, the second image taken by the back facing camera may be a picture of the individual taking the photograph. This image could then be used to authenticate and verify the first image, wherein the second image is encoded within a segment of the first image.

Certain conventional devices also have the ability to capture several pictures consecutively after shutter press, wherein the multiple pictures are used to adjust undesirable visual effects such as poor lighting or jitter. In one embodiment, each of these captured images will embed links, thumbnails or other identifying information for the images that are captured during the same brief segment of time following shutter press.

In one embodiment, present invention allows other data 430 to be embedded in, for example, the marker segment of the JFIF file as shown in FIG. 4. This field is flexible and can comprise many different types of associated metadata, e.g., text annotation, voice annotation, gyro sensor data, heat sensor data, barometric data etc. For example, in one embodiment, field 430 can comprise a user annotation regarding a particular image. The annotation can be either textual or verbal. If verbal, then an audio clip is encoded into field 430 with the user's annotation. In one embodiment, the annotation field 430 may be manipulated by the user at any point in time after capturing the image. Similar to the functionality for the audio data 422, this feature allows the user the flexibility to pair any audio clip with an image after it has been taken. This can be useful if the user is creating, for example, a slideshow to be viewed with dedicated software 312.

In one embodiment, dedicated software 312 or even equipment 310 can be configured to have slideshow capabilities, and further configured to display images in the slideshow in a way such that the associated audio clip either from the audio data field 422 or from the other field 430 for an image is played in full while displaying the image and before transitioning to the next image. The user may, in one embodiment, be able to choose the field (e.g., 422 or 430) that the audio clips should be accessed from while viewing the slideshow. Further, the slideshow capabilities may be configured to also display the related images identified in field 428 when displaying an image to the extent any are specified.

In a different embodiment, field 430 may comprise a user's setting regarding sharing permissions for the image. For example, the user may specify within the image with whom the image may be shared on a social networking website, e.g., Facebook. The software 312 would then recognize the user's setting after the image has been transferred over from equipment 310 and automatically upload the image to the designated social networking site in accordance with the user specified permission settings.

In one embodiment, all the associate metadata fields, e.g., fields 422, 424, 426, 428 and 430 are encrypted and can only be accessed by a user or device possessing the necessary key to decrypt the information. For example, in certain instance, while the user may want the flexibility of preserving GPS data in an image for personal reasons, the user may not desire to have the GPS metadata published if the image is shared through email or via a social networking site. In such cases, it is beneficial to have the option to encrypt the metadata fields so the user has control over the sharing of the associated metadata fields. In one embodiment, certain associated metadata fields, e.g., time and GPS data, can be encrypted and hidden from everyone including the user, and only used by standard enabled equipment 310 and dedicated software 312 for sorting and organizational purposes and to identify related images. In one embodiment, the user may be able to choose through a user interface whether or not the associated metadata fields should be encrypted.

In a typical JFIF image, following the JFIF marker segment, there may be one or more optional JFIF extension marker segments. Extension segments are used to store additional information. FIG. 5 illustrates the modification of a JFIF extension segment to incorporate associate metadata in accordance with an embodiment of the present invention.

Similar to FIG. 4, certain fields shown in FIG. 5 are also found in a conventional JFIF extension marker segment. For example, a typical JFIF extension marker segment will comprise the APP0 marker 504 with the value 0xFFE0, a length field 506, an identifier 508, a thumbnail format 510, and thumbnail data 512.

In accordance with an embodiment of the present invention, the JFIF extension marker segment can be modified to include additional fields such as the audio data field 514, the GPS data field 516, the time data field 518, the related images field 520, and the other data field 522. Fields 514, 516, 518, 520, and 522 work in substantially the same way as the corresponding fields in FIG. 4.

It is worth noting that while the present invention has been discussed in the context of the JFIF image file format, the novel aspects and techniques of the invention can be used with any number of various different file formats as well. For example, the Exchangeable image file format (EXIF) is a standard that specifies the formats for images used by digital cameras and scanners also. One of the fields that the EXIF standard defines in its specification is a "Makernote" field which typically has a storage capacity of between 0 and 64 kilobytes. The EXIF standard defines a Makernote tag, which allows camera manufacturers to place custom format metadata in the file typically related to the digital camera settings, e.g., shooting modes, focusing modes, etc. The present invention can also be applied to extending the Makernote field of the EXIF standard to include the additional metadata discussed above, e.g., audio data, related image information, GPS data, time data, etc.

The user benefits from rendering information related to the moment of the image capture because accessing information such as contemporaneous audio clips, text annotation and GPS data not only makes the user's experience of the image more enjoyable but it allows the user to do more with the image, e.g., search audio data, organize images using text annotations etc.

Figure 6:
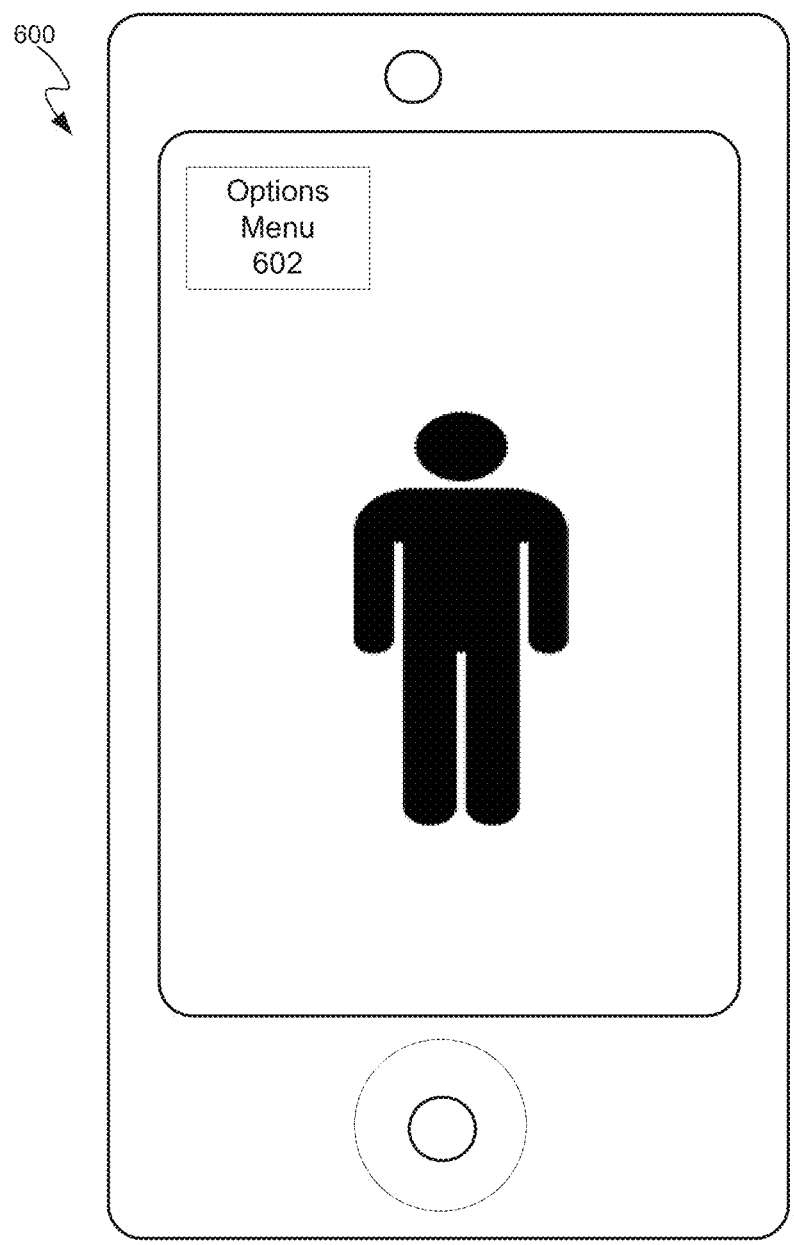
FIG. 6 illustrates an exemplary method of displaying images with associated metadata in accordance with an embodiment of the present invention.

FIG. 6 illustrates an exemplary method of displaying images with associated metadata in accordance with an embodiment of the present invention. In order to display images and the associated embedded metadata, device 600 should be configured so that it can read the images including all the associated metadata and attribute information in conformance with the modified or new file format standard taught by the present invention. Device 600 can either be an example of standard enable equipment 310, or it could also have the standard enabled dedicated software 312 installed onto it. Traditional devices that do not have the dedicated software to display the associated metadata will simply display the image in the conventional way without allowing the user the option to access the embedded fields.

As shown in FIG. 6, when an image with associated metadata is displayed on the screen of device 600, an icon 602 can appear on the screen alerting the user that additional data associated with the image is available for access.

Figure 7:
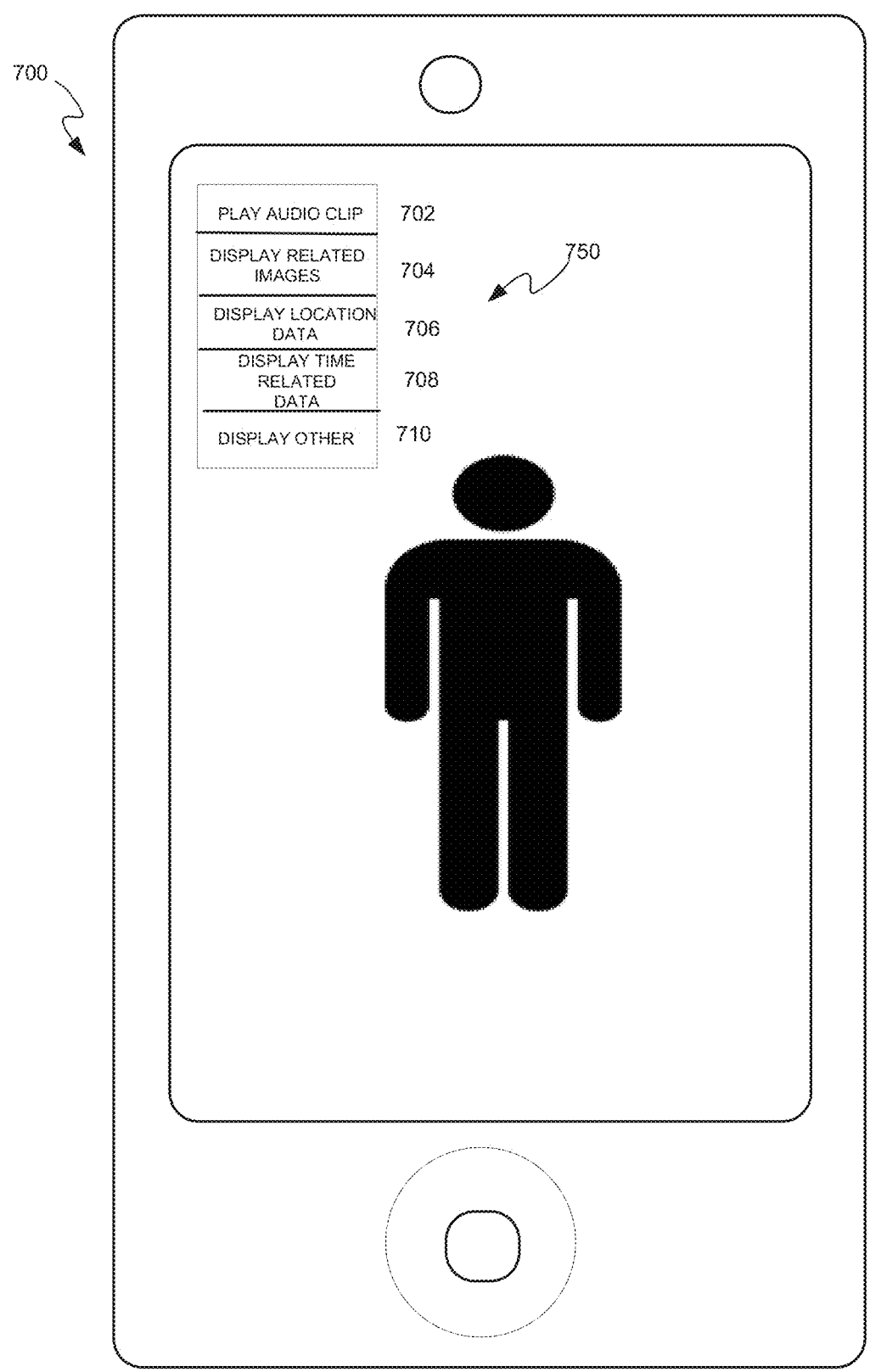
FIG. 7 illustrates an exemplary method of providing options to access the metadata associated with an image on display in accordance with an embodiment of the present invention.

When the user clicks on the options icon 602 appearing on screen, a drop down menu of options becomes available to the user in accordance with one embodiment of the present invention. FIG. 7 illustrates an exemplary method of providing options to access the metadata associated with an image on display in accordance with an embodiment of the present invention.

The drop down menu 750 allows the user to play the associated audio clip 702, display related images 704, display location data 706, display time related data 708 and display other data 710. Each of the options displays or plays the associated metadata by accessing the corresponding field shown in FIG. 4. Of course, if certain data, e.g., GPS data 424, or time data 426, is encrypted and unavailable, options pertaining to those fields in the options menu 750 will be dimmed.

Figure 8:
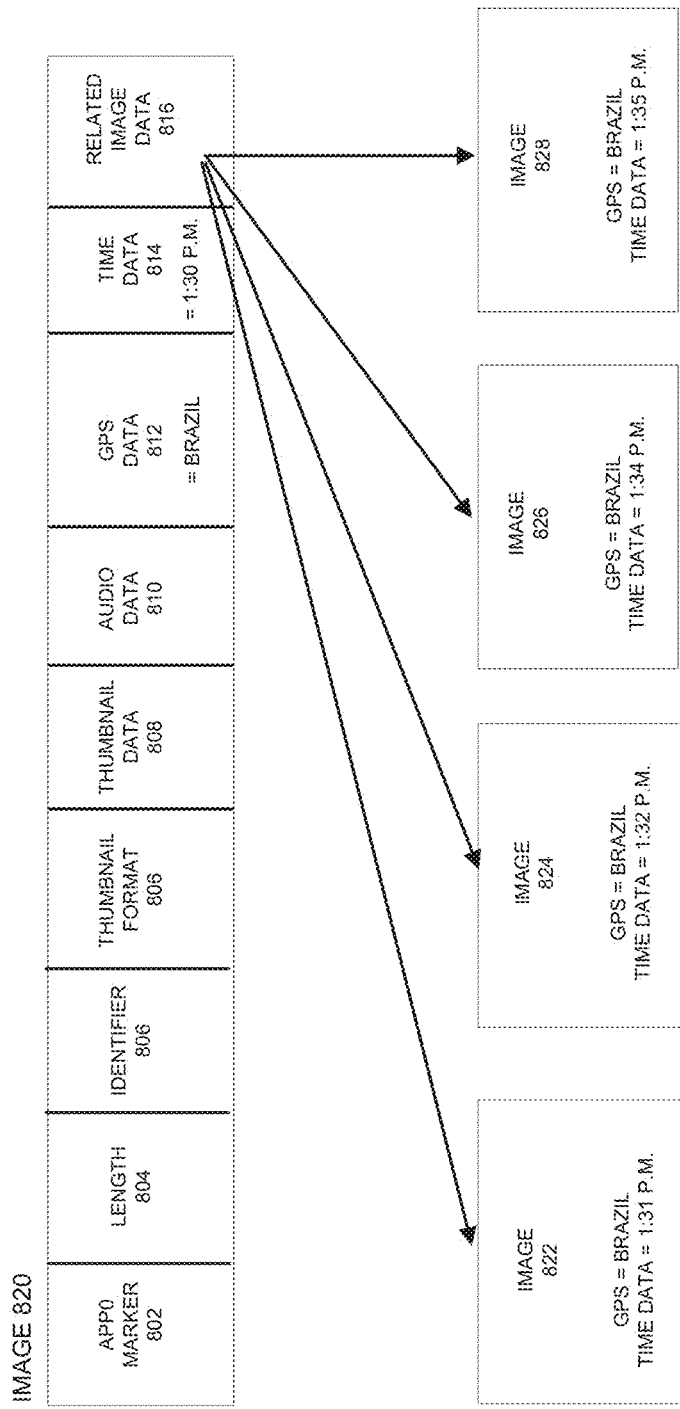
FIG. 8 illustrates an exemplary method of populating the related images metadata field in an exemplary file format in accordance with an embodiment of the present invention.

FIG. 8 illustrates an exemplary method of populating the related images metadata field in an exemplary file format in accordance with an embodiment of the present invention. Image 820 has similar fields to the file format illustrated in FIG. 5, with an APP0 marker field 802, a length field 804, an identifier field 806, a thumbnail format field 806, a thumbnail data field 808, an audio data field 810, a GPS data field 812, a time data field 814, and a related image data field 816.

In one embodiment of the present invention, the pointers or links in the related image field 816 can be populated based on data in the GPS data field 812 and the time data field 814. For example, the software on device equipment 310 or the application 312 can both be enabled to populate the related image data 816 based on a prescriptive rule that operates on fields 812 and 814 and selects images that are taken within a certain radius of the location pointed to by the GPS data 812 and within a certain time duration of the value of time data 814. In the example of FIG. 8, the application of the prescriptive rule identifies all the other images, 822, 824, 826 and 828, on equipment 310 that were taken in Brazil around the 1:30 p.m. timeframe.

In one embodiment of the present invention, the data in the GPS field 812 and time data field 814 can also be used to organize all the images in a folder structure both on equipment 310 and on a computer running software application 312 after the images have been transferred over from equipment 310. For example, the GPS data can be used as a primary criterion for categorizing images. Images taken at different locations, e.g., locations more than 50 miles away from each other, can be placed in different folders. The time data can then be utilized as a secondary criterion to organize images within each folder. For example, within the Brazil folder created for the images identified in FIG. 8, the images would be sorted in the following order: Image 820 at 1:30 p.m., Image 822 at 1:32 p.m., Image 824 at 1:34 p.m., Image 826 at 1:34 p.m., and Image 828 at 1:35 p.m. Of course, in addition to the GPS field 812 and time data field 814, images can be organized based on criterion extracted from the other metadata fields as well.

Figure 9:
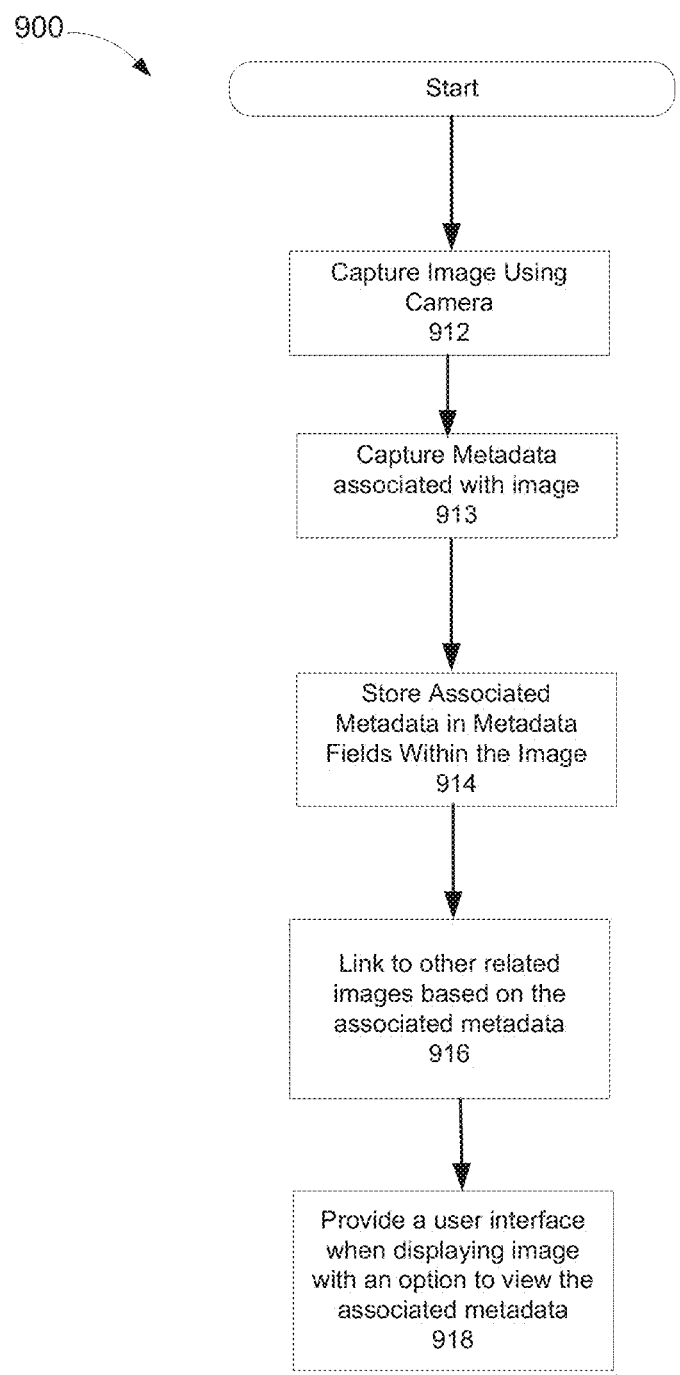
FIG. 9 depicts a flowchart of an exemplary process for storing associated metadata in a segment of an image on an image capture device in accordance with one embodiment of the present invention.

FIG. 9 depicts a flowchart of an exemplary process for storing associated metadata in a segment of an image on an image capture device in accordance with one embodiment of the present invention.

At step 912, an image is captured with a camera, which functions substantially similarly to standard enabled equipment 310 and device 600. At step 913, metadata associated with the image is captured, e.g., audio data. In one embodiment, the associated metadata may be captured substantially simultaneously with the image.

At step 914, the captured image is stored with all the relevant associated metadata in the respective fields, e.g., audio data field 422, GPS data field 424, time data field 426, related images data field 428 and other data field 430 as discussed in connection with FIG. 4.

At step 916, the captured image, in one embodiment, can link to other related images based on user specified criteria that uses data in other metadata fields, e.g., GPS, time, etc. The links or pointers to these related images can be stored in the related image data field 428 of the captured image. In one embodiment, a prescriptive rule is run when the image is stored that searches for and identifies all such related images available on the camera.

At step 918, the camera recognizes the image as having a specialized file format with associated metadata fields and displays the captured image with a user interface that provides the user with an option to access the associated metadata. One example of this interface is provided in FIG. 7 in the form of a menu of available options 750.

Figure 10:
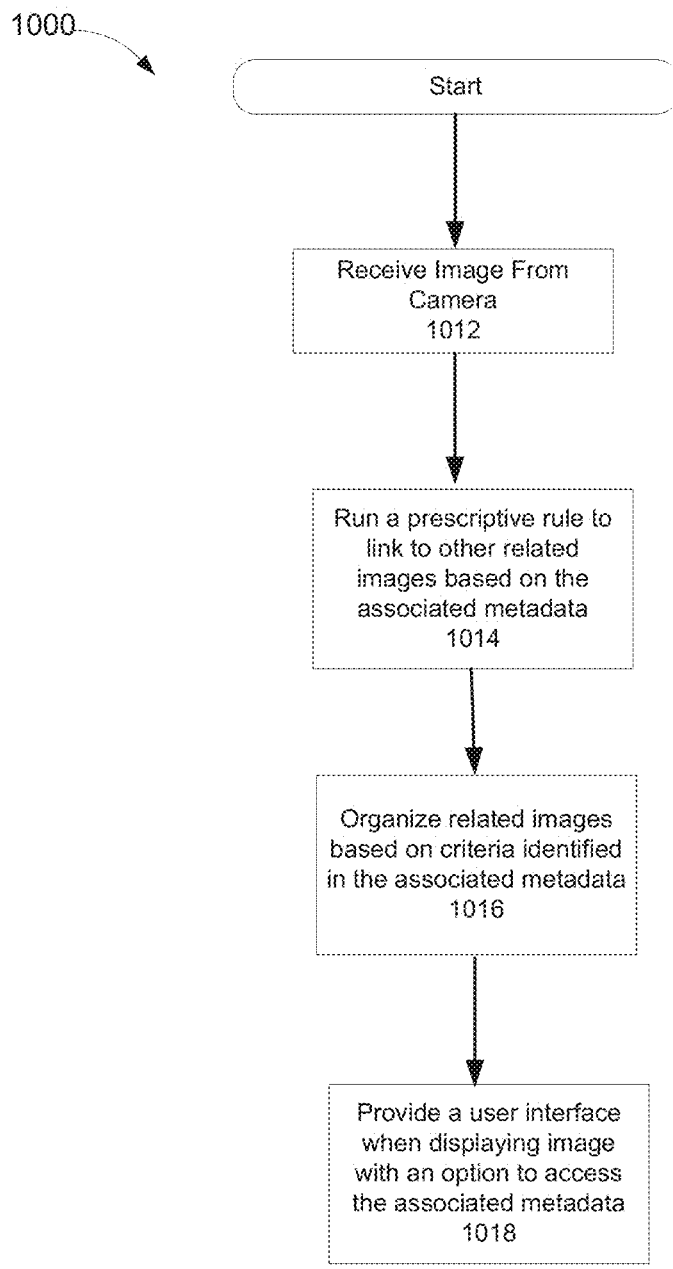
FIG. 10 depicts a flowchart of an exemplary process of receiving and accessing associated metadata in a segment of an image from an image capture device in accordance with one embodiment of the present invention.

FIG. 10 depicts a flowchart of an exemplary process of receiving and accessing associated metadata in a segment of an image from an image capture device in accordance with one embodiment of the present invention.

At step 1012, a personal computer or any other type of computing device that is capable of connecting with the camera (or equipment 310) and has dedicated software 312 installed on it receives the captured image from the camera.

At step 1014, the prescriptive rule to identify related images may be run again, in one embodiment, to update the related image data field 428 in the image to account for the possibility that the computing environment on which the image is downloaded contains more related images than were available on the camera. The related image data field 428 is subsequently updated in accordance with the results provided by the prescriptive engine.

At step 1016, the images related to the downloaded image can be organized based on user specified criteria that use data in the other associated metadata fields. For example, the user may want all his images organized based on location primarily, but may want all the images categorized under a particular location to be organized by time. Accordingly, as shown in FIG. 8, the images can be grouped primarily based on location and then sorted using time as a secondary criterion.

Finally, at step 1018, the dedicated software 312 is also operable to provide an interface for displaying the image with an option to view the associated metadata similar to the embodiment illustrated in FIG. 7.

Figure 11:
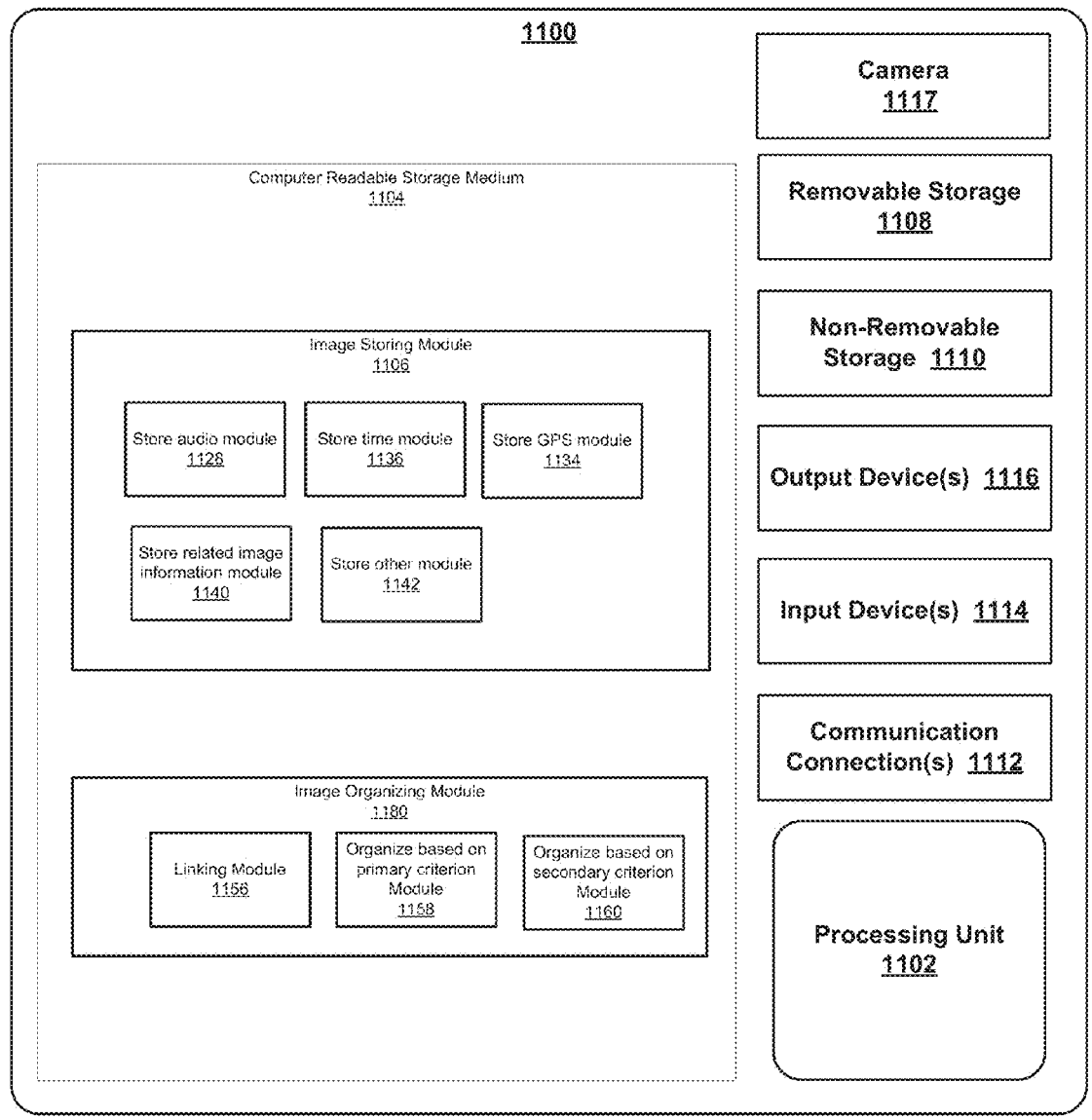
FIG. 11 is a more detailed block diagram of an exemplary computer system and illustrates the various hardware and software components for storing and organizing images in both the camera and the software application in accordance with one embodiment of the present invention.

FIG. 11 is a more detailed block diagram of an exemplary computer system and illustrates the various hardware and software components for storing and organizing images in both the camera and the software application in accordance with one embodiment of the present invention. The camera, in one embodiment, functions substantially similarly to equipment 310, and the software application functions substantially similarly to dedicated software 312.

FIG. 11 shows a block diagram of an exemplary computing system environment 1100, in accordance with one embodiment of the present invention. With reference to FIG. 11, an exemplary system module for implementing embodiments includes a general purpose computing system environment, such as computing system environment 1100. Computing system environment 1100 may include, but is not limited to, laptops, tablet PCs, notebooks, mobile devices, and smartphones. In its most basic configuration, computing system environment 1100 typically includes at least one processing unit 1102 and computer readable storage medium 1104. Depending on the exact configuration and type of computing system environment, computer readable storage medium 1104 may be volatile (such as RAM), non-volatile (such as ROM, flash memory, etc.) or some combination of the two. Portions of computer readable storage medium 1104 when executed facilitate image or video capture.

Additionally, computing system environment 1100 may also have additional features/functionality. For example, computing system environment 1100 may also include additional storage (removable and/or non-removable) including, but not limited to, magnetic or optical disks or tape. Such additional storage is illustrated in FIG. 11 by removable storage 1108 and non-removable storage 1110. Computer storage media includes volatile and nonvolatile, removable and non-removable media implemented in any method or technology for storage of information such as computer readable instructions, data structures, program modules or other data. Computer readable medium 1104, removable storage 1108 and nonremovable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1100. Any such computer storage media may be part of computing system environment 1100.

Computing system environment 1100 may also contain communications connection(s) 1112 that allow it to communicate with other devices. Communications connection(s) 1112 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 1112 may allow computing system environment 1100 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 1112 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 1100 may also have input device(s) 1114 such as a keyboard, mouse, pen, voice input device, touch input device, remote control, etc. Output device(s) 1116 such as a display, speakers, etc. may also be included. All these devices are well known in the art and are not discussed at length.

Computing system environment 1100 can also have an image storing module 1106. Image storage module 1106 comprises store audio module 1128, which is responsible for accessing and encoding associated audio data into the audio data field 422 of the image. Store time module 1136 is responsible for accessing and encoding associated time data into the time data field 426 of the image. Store GPS module 1134 is responsible for accessing and encoding associated GPS data into the GPS data field 424 of the image. Store related image information module 1140 is responsible for accessing and encoding associated related image information data into the related image data field 428 of the image. Store other module 1142 is responsible for accessing and encoding associated other data into the other data field 430 of the image.

Computing system environment 1100 may also have an image organizing module 1180. Image organizing module can comprise linking module 1156, organize based on primary criterion module 1158, and organize based on secondary criterion module 1160. Linking module 1156 is responsible for running the prescriptive engine responsible for linking the related image data field 428 of an image with associated related images. Module 1158 organizes the related images based on a primary criterion, e.g., GPS, identified by a user. Module 1160 then sorts the images in each of the categories from the first categorization based on a secondary user specified criterion.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for storing digital images, said method comprising:
    capturing an image using a digital camera system;
    capturing metadata, using a processor, said metadata associated with said image at a moment of capture of said image, wherein said metadata comprises sensory information regarding said moment of capture of said image; and
    storing said metadata in at least one field within a file format, wherein said file format defines a structure for storing said image, and wherein said at least one field is located within an extensible segment of said file format, and wherein a user of said digital camera system is provided an option to encrypt said metadata, wherein at least one type of said metadata is related image information, wherein said at least one type of said metadata is selected from a group consisting of: GPS data and time data, and wherein said storing comprises:
        linking said image to at least one related image, wherein said linking comprises using said at least one type of said metadata; and
        embedding information to perform said linking in a field within said file format, wherein said field is dedicated to storing said related image information.

2. The method of claim 1, wherein said metadata is selected from a group consisting of: audio data; GPS data; time data; related image information; heat sensor data; gyroscope data; barometric data; annotated text; and annotated audio.

3. The method of claim 1, wherein said file format is a modification to an existing file format, wherein said existing file format is selected from a group consisting of: JFIF, EXIF, TIFF, PNG, and GIF.

4. The method of claim 1, wherein said linking further comprises:
    executing a user specified prescriptive rule using saki at least one type of said metadata.

5. The method of claim 4, wherein said user specified prescriptive rule uses two types of said metadata, wherein a first type of metadata is used to categorize said at least one related image into one of a plurality of categories, and wherein a second type of metadata is used to sort said at least one related image within said one of a plurality of categories.

6. The method of claim 5, wherein said option is selected from a group consisting of: option to listen to audio data; option to view GPS data; option to view time data; and option to view related image information.

7. The method of claim 1, wherein at least one type of said metadata is audio data, and further wherein a length of an audio clip encoded into said audio data is operable to be selected by a user.

8. The method of claim 7, wherein said storing comprises:
    recording said audio clip in response to an operation, wherein said operation can be selected from a group consisting of: a focusing operation prior to image capture on said camera; actuating an image capture trigger; actuating an audio capture trigger; a touch screen operation; and an initiation of a timer.

9. The method of claim 8, wherein said storing further comprises:
    stopping said recording in response to an operation, wherein said operation can be selected from a group consisting of: actuating a trigger; a touch screen operation; and an expiration of a timer.

10. A method for decoding an image, said method comprising:
    receiving an image from a digital image capture device, wherein said image comprises a file format with an extensible segment, and wherein said extensible segment comprises at least one field for storing metadata associated with said image or a moment of capture of said image, wherein said metadata comprises sensory information regarding said moment of capture of said image, wherein at least one type of said metadata is GPS data, wherein said GPS data is encrypted, and wherein encrypted GPS data is used to categorize said image amongst a plurality of images downloaded from said image capture device;
    displaying said image within a user interface, wherein said user interface comprises an option to access said metadata;
    responsive to exercising said option, presenting said user with an on-screen menu comprising a listing of a plurality of types of sensory information of said metadata; and
    accessing said file format and rendering sensory information of a user selected type of sensory information responsive to a user selection of said on-screen menu.

11. The method of claim 10, wherein said metadata is selected from a group consisting of: audio data; GPS data; time data; related image information; heat sensor data; gyroscope data; annotated text; and annotated audio.

12. The method of claim 10, wherein said file format is a modification to an existing file format, wherein said existing file format is selected from a group consisting of: JFIF, EXIF, TIFF, PNG, and GIF.

13. The method of claim 10, wherein said option is selected from a group consisting of: option to listen to audio data; option to view GPS data; option to view time data; and option to view related image information.

14. The method of claim 10, wherein at least one type of said metadata is audio data, and further wherein a length of an audio clip encoded into said audio data is operable to be selected by a user.

15. The method of claim 10, wherein at least one type of said metadata is audio data, and wherein said displaying further comprises:
    presenting said image within a slideshow, wherein an audio clip associated with said audio data is played during said presenting, and wherein said slideshow transitions to a subsequent image after said audio clip has ended.

16. The method of claim 10, wherein at least one type of metadata is time data, and wherein said time data is operable to be used to identify images related to said image.

17. The method of claim 10, wherein at least one type of metadata is related image information, and wherein a field for encoding said related image information comprises links to said related image information.

18. An apparatus for storing digital images, said apparatus comprising:
- a display screen configured to display an image;
- a memory;
- a digital camera;
- a processor configured to:
    - capture said image using said digital camera;
    - capture metadata associated with said image or a moment of capture of said image, wherein said metadata comprises sensory information regarding said moment of capture of said image;
    - store said metadata associated with said image in at least one field within a file format, wherein said file format defines a structure for said image, and wherein said at least one field is located within an extensible segment of said file format, and wherein a user of said digital camera system is provided an option to encrypt said metadata, wherein at least one type of said metadata is related image information and wherein said at least one type of said metadata is selected from a group consisting of: GPS data and time data;
    - link said image to at least one related image using said at least one type of said metadata; and
    - embed information to link said image in a field within said file format, wherein said field is dedicated to storing said related image information.

* * * * *